United States Patent Office 3,146,236
Patented Aug. 25, 1964

3,146,236
MANUFACTURE OF TRIETHYLENEDIAMINE
Ronald W. Swanson, Broomall, Pa., assignor to Air Products and Chemicals, Inc., Philadelphia, Pa., a corporation of Delaware
No Drawing. Filed June 29, 1962, Ser. No. 206,152
3 Claims. (Cl. 260—268)

This invention relates to the manufacture of triethylenediamine type of compounds in which 2 nitrogen atoms are joined by 3 ethylene groups and in which no more than 2 methyl groups are substituted on the ethylene groups.

A series of patents including 2,937,176, 2,977,363, 2,977,364, and 2,985,658 have described the synthesis of diazabicyclooctane, conveniently called triethylenediamine. Solid sorptive catalyst having an acid activity, sometimes designated as cracking catalyst, is effective in the transformation of diethylenetriamine (DETA) at a temperature within the range from about 300° C. to about 500° C. in an isothermal catalytic reactor. It is feasible to write formulas for components of other organic feed stocks by theorizing what products might be derivable by copolymerization of ethylene imine or mixtures of ethylene imine and ethylene oxide. In producing the methyl derivatives of triethylene diamine, the organic feed stock includes high boiling compositions which can be classified as copolymers of mixtures of ethylene imine and propylene imine, 2,3 butylene imine, ethylene oxide, propylene oxide, 2,3 butylene oxide and mixtures thereof. The organic feed stock may result from the reaction of a material such as ethylene chloride with ammonia to produce a variety of polymers of ethylene imine, without the monomer ever being formed in the preparation of the polymer.

In accordance with the present invention there is a departure from the previous practice of employing an isothermal reactor, and the catalyst is distributed among several independent adiabatic catalyst beds. There must be at least three beds but usually less than ten beds. The reactant stream is subjected to heat transfer means just prior to the entry to each of the catalyst beds and the temperature of the reactant stream is adjusted to be at least 260° C. at the entry to the initial bed of catalyst and the temperature of the reactant stream is adjusted to be higher at the entry of each successive bed than it was at the entry to the previous bed, and the temperature of the reactant stream at the exit of each bed is adjusted to be lower than 450° C. and the temperature of the reactant stream at the exit of the last of the catalyst beds is adjusted to be at least 350° C. In order to obtain the good yields of the present invention, the rate of temperature increase during passage through about the last third of the total catalyst should be significantly less than the rate of temperature increase during passage through the initial third of the total catalyst. A consistent or uniform change of slope of the curve relating temperature increase to the increment of path through the catalyst is not necessary, inasmuch as the smaller total slope for the terminal third relative to the total slope for the initial third provides the essential control, which can be described as a generally decreasing rate of temperature increase as the reactant stream advances along the path through the catalyst. The triethylenediamine type of compound is removed from the effluent from the last of the catalyst beds.

The nature of the invention is further clarified by reference to a plurality of examples.

EXAMPLE 1

A laboratory apparatus for the preparation of triethylenediamine included a downflow tube divided into seven sections consisting of three catalyst beds spaced between four beds of inert granules. Three muffle furnaces were shiftable to permit either the heating of the catalyst beds for isothermal operation or the heating of the beds of inert granules for adiabatic operation. Kaolin cracking catalyst granules promoted the formation of triethylenediamine from the vapors of diethylenetriamine at a space rate of 0.5 volume of liquid DETA per volume of total catalyst per hour. Three preparations were conducted at about the same average temperature (about 356° C.), but maintaining different temperature profiles through the path through the beds of the catalyst. It is customary to prepare graphs showing the curve relating the temperature to increments of the path of the reactant stream through the catalyst, and to refer to the curves on such graphs as a temperature profile. In the isothermal run, the temperature profile was essentially flat, that is, the temperature was essentially the same throughout the path through the catalyst. In the run with a downward profile the average temperature of the terminal portion of the path was lower than the temperature of the initial portion of the catalyst, as is customary in a high proportion of industrial operation of vapor phase catalytic methods. In the run in which the graph of the temperature at various points along the path through the catalyst beds provided an upward profile, the average temperature of the terminal portion of the catalyst was higher than the temperature of the inital section of the catalyst. Surprisingly, the yield was significantly better in such run providing the upward profile. Data relating to said three runs are shown in Table I.

Table I

| | Temperature Profile | | |
|---|---|---|---|
| | Flat | Downward | Upward |
| Sections of catalyst bed: | | | |
| Initial_____°C__ | 355 | 382 | 336 |
| Middle_____°C__ | 355 | 358 | 371 |
| Terminal_____°C__ | 355 | 335 | 371 |
| Average bed temperature__°C__ | 355 | 358 | 362 |
| Triethylenediamine, percent by weight_____ | 12.0 | 6.5 | 15.1 |

Because the 15.1% yield of triethylenediamine is 25.8% superior to the 12% yield, the upward profile has an advantage over isothermal operation.

EXAMPLE 2

The allocation of kaolin catalyst granules in three adiabatic reactors was adjusted so that the path through the initial reactor accounted for 14% of the total catalyst, and the path through the terminal reactor accounted for 58% of the total catalyst, and the path through the middle reactor accounted for the middle 14–42% of the catalyst path. The catalyst was distributed among the reactors essentially on the principle of each reactor having twice as much catalyst as the previous reactor. In a system of 3 reactors, this principle required proportions of 1/7, 2/7, and 4/7 of the total catalyst in the initial, middle, and terminal reactors. The vapor stream was subjected to heat transfer just prior to entering each reactor. By reason of the exothermic heat of reaction, each bed had a higher terminal temperature than its initial temperature. The reactant stream consisted of 4 volumes of ammonia and one volume of a residual amine designated as Ethylene Amine P, and containing triethylenetetraamine and a variety of other high boiling polymers (linear, cyclic, branched cyclic, etc.) of ethylene diamine and/or ethylene imine. The space rate was 0.2 liquid volumes of amine per volume of catalyst per hour. Data relating to the temperatures measured at the six points in the three beds are shown in Table II, together with the rate of temperature increase expressed as ° C. per 10% of catalyst path, thus expressing a value for the slope of the temperature profile, and showing the increase of temperature at a generally decreasing rate as the reactant stream advances through the catalytic zone.

*Table II*

| Bed No. | Percent of catalyst Path | Initial, ° C. | Terminal, ° C. | Average, ° C. | ΔT | Rate, ΔT/10% |
|---|---|---|---|---|---|---|
| 1 | 0–14 | 304 | 332 | 318 | 28 | 20.0 |
| 2 | 14–42 | 315 | 360 | 337 | 45 | 16.1 |
| 3 | 42–100 | 349 | 385 | 367 | 36 | 6.2 |

Thus as the reactant stream advanced through the catalyst path the temperature of the stream increased at a generally decreasing rate of temperature increase. By controlling the temperature as indicated in the table, a yield of 20.9% of triethylene diamine was obtained. Using the same reactant stream, and space rate, but maintaining all the catalyst beds at 344° C. for isothermal operation, the yield of triethylene diamine was only 16% by weight of the feed stock.

EXAMPLE 3

A series of preparations of triethylene diamine embodied substantially the same conditions of Example 2, including liquid hourly space rate of 0.2, Ethylene Amine P feedstock, 4NH$_3$/amine ratio, and adiabatic operation, but varying the inlet temperatures to said three reactors. In order to avoid adverse lowering of the yield of triethylene diamine, the inlet temperatures for the specific combination of apparatus and reactant stream investigated should be from about 260° C. to about 310° C. for the first reactor, 280 to 330° C. for the second reactor, and about 300 to 350° C. for the third reactor. The temperature at the exit of the first and second reactors must be less than 450° C. and the temperature at the exit of the third reactor must be within the range from 350° C. to 450° C.

EXAMPLE 4

A series of preparations of triethylene diamine establishes that various polymers of ethylene imine are suitable as feed materials. Inasmuch as triethylene diamine is a solid instead of a liquid, certain advantages accrue from the use of a homogogue which is a liquid, such as a monomethyl and/or dimethyl derivative (the 2,2′ or the 2,3 or the 2,3′ isomers of dimethyl triethylenediamine, or mixtures thereof, being here treated as equivalents), whereby the liquid may be handled in pumping and mixing equipment. Such compounds have the formula N(CHRCHR)$_3$N in which at least 4 of the 6 R's are hydrogen and the other two R's are selected from the group consisting of hydrogen and methyl. Such products are prepared by including propylene amine, propylene imine, 2,3 butylene imine, and/or polymers comprising alkylene imine units in the reaction stream. Copolymers or polymers containing units corresponding to ethylene oxide, or propylene oxide or 2,3 butylene oxide can supplement the predominantly polyimine composition. A generic formula, conveniently designated as C$_2$N$_2$H$_2$Q$_4$, can be shown as

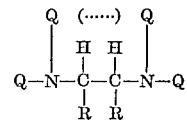

in which each Q or Q—Q is an organic group containing only C, H, O, and N atoms and having not more than 2 carbon atoms in any chain of carbon atoms between or beyond atoms of the group consisting of N and O and each R is selected from the group consisting of hydrogen and methyl. The formulas for each and all such compounds can be written by theorizing what products might be derivable by copolymerization of one or more members of the group consisting of ethylene imine, propylene imine, 2,3 butylene imine, ethylene oxide, propylene oxide, and 2,3 butylene oxide.

By a series of tests, it is shown that the important features of the temperature profile for superior yield of triethylene diamine are the terminal temperature within the 350° C. to 450° C. range and the initial temperature significantly lower than such exit temperature, with the temperature rising in each of the beds intermediate the initial and terminal portions. As the reactant stream advances through the several beds there is a generally decreasing rate of temperature increase so that the steepest portion of the temperature slope is nearer the inlet than the outlet and so that the temperature slope decreases nearly toward flatness near the terminal portion of the path through the catalyst beds. Thus it is necessary: to maintain portions of the catalyst as a plurality of independent adiabatic beds of catalyst; to provide heat transfer means adjusting the temperature of the reactant stream just prior to the entry to each catalyst bed; to regulate the inlet temperature to each catalyst bed so that it is higher than the inlet temperature to the previous bed; to adjust the temperature as the reactant stream advances along various portions of the path through the adiabatic catalyst beds so that the average temperature in the initial 10% of said path is significantly lower than the average temperature during the terminal 33% of said path, and so that the average temperature in the middle 11% to 67% of said path through the catalyst is intermediate said lower average initial temperature and said higher average terminal temperature; to control temperatures of the reactant stream so that the rate of temperature increase decreases generally from initial through terminal portions of the path; to maintain a temperature less than 450° C. at the exit of each reactor; to maintain adiabatically at the exit of said path a temperature within the range from about 350° C. to 450° C.; and to recover N(CHRCHR)$_3$N from the effluent from the catalyst path. The upward profile is especially advantageous in increasing the triethylenediamine yield when the liquid hourly space rate is within the range from 0.06 to 0.6, and the higher space rates conventional in many catalytic conversions should be avoided.

EXAMPLE 5

A system of four catalyst reactors was designed to contain catalyst in the proportions of approximately 2/32, 3/32, 9/32, 18/32, or 1/16, 1½/16, 4½/16 and 9/16, or 5.8, 8.5, 27.7, and 58% of the total catalyst, so that the interstage heat transfer equipment is positioned at 5.8%, 14.3% and 42% of the path through the several beds of calcined kaolin cracking catalyst. A reactant stream consisted of four volumes of ammonia per gaseous volume of Ethylene Amine P was directed through the four beds of catalyst at a space rate of 0.14 volume of liquid Ethylene Amine P per catalyst volume per hour entering at about 15 p.s.i.g., and leaving at about 8 p.s.i.g.

Data relating to the temperature profile for two runs are shown in Table III.

*Table III*

| Run Number | 514 | 515 |
|---|---|---|
| First Reactor: | | |
| Inlet, °C | 317 | 319 |
| Outlet, °C | 322 | 324 |
| °C./10% | 8.7 | 8.7 |
| Second Reactor: | | |
| Inlet, °C | 331 | 333 |
| Outlet, °C | 342 | 343 |
| °C./10% | 13.0 | 11.8 |
| Third Reactor: | | |
| Inlet, °C | 343 | 346 |
| Outlet, °C | 373 | 383 |
| °C./10% | 10.8 | 13.4 |
| Fourth Reactor: | | |
| Inlet, °C | 346 | 353 |
| Outlet, °C | 357 | 367 |
| °C./10% | 0.19 | 0.24 |
| Triethylenediamine: | | |
| Percent of Ethylene Amine P | 16.3 | 20.7 |
| Percent of liquid effluent | 22.2 | 28.5 |

The achievement of a yield as high as 20.7% from a residual amine is inexpensive as Ethylene Amine P is a significant forward step beyond some of the triethylenediamine syntheses described in previous literature. It will be noted that although the heat exchangers added heat to the reactant stream prior to entry into the second and third reactors, but that the heat exchanger cooled the reactant stream prior to its entry into the fourth reactor. Various modifications of the control of the heat exchangers are feasible without departing from the previously discussed requirements.

Obviously, many modifications and variations of the invention as hereinbefore set forth may be made without departing from the spirit and scope thereof, and therefore only such limitations should be imposed as are indicated in the appended claims.

What is claimed is:

1. In a method of manufacturing a compound corresponding to the formula $N(CHRCHR)_3N$ in which at least 4 of the 6 R's are hydrogen, and in which each of the other 2 R's is selected from the group consisting of hydrogen and methyl, by directing a vaporous reactant stream through solid sorptive catalyst granules having cracking activity at an elevated temperature, said reactant stream containing the vapors of normally liquid polymer of ethylene imine, modified by not more than a minor molar amount of copolymer with at least one of the group consisting of propylene imine, 2,3-butylene imine, ethylene oxide, propylene oxide, and 2,3-butylene oxide, the improvement which consists of: directing said vaporous reactant stream through catalyst granules at a space rate within the range from about 0.06 to about .6 liquid volumes of organic feed stock per volume of catalyst per hour; maintaining portions of the catalyst as a few independent adiabatic beds of catalyst; providing heat transfer means just prior to the entry to each catalyst bed; regulating the inlet temperature of each bed to be higher than the inlet temperature of the previous bed; maintaining adiabatically at the exit of each catalyst bed a temperature lower than 450° C.; regulating the inlet temperature to each catalyst bed so that as the reactant stream advances along the various portions of the path through the adiabatic catalyst beds, the temperature is regulated to assure an average temperature in the initial 10% of said path significantly lower than the average temperature during the terminal 33% of said path; regulating the temperature of the reactant stream in each catalyst bed to maintain a generally decreasing rate of temperature increase; and maintaining adiabatically at the exit of said path, temperature within the range from 350° C. to 450° C., whereby the effluent from the catalyst path contains significant amounts of $N(CHRCHR)_3N$.

2. The method of manufacturing a compound corresponding to the formula $N(CHRCHR)_3N$ in which at least 4 of the 6 R's are hydrogen, and in which each of the other two R's is selected from the group consisting of hydrogen and methyl, which method includes: directing a vaporous reactant stream along a path through silica alumina cracking catalyst granules at a space rate within the range from about 0.06 to about 0.6 liquid volumes of organic feed stock per volume of catalyst per hour; employing as the organic feed stock for said reactant stream a composition consisting of the vapors of normally liquid ethylenediamine polymers derived from at least one of the group consisting of ethylene imine, propylene imine, 2,3-butylene imine, ethylene oxide, propylene oxide, and 2,3 butylene oxide; maintaining portions of the catalyst as a few independent adiabatic beds of catalyst; providing heat transfer means just prior to the entry to each catalyst bed; regulating the inlet temperature of each bed to be higher than the inlet temperature of the previous bed; maintaining adiabatically at the exit of each catalyst bed a temperature lower than 450° C.; regulating the inlet temperature to each catalyst bed so that as the reactant stream advances along various portions of the path through the adiabatic catalyst beds, the temperature is regulated to assure an average temperature in the initial 10% of said path significantly lower than the average temperature during the terminal 33% of said path; regulating the temperature of the reactant stream in each catalyst bed to maintain a generally decreasing rate of temperature increase; maintaining adiabatically at the exit of said path a temperature within the range from about 350° C. to 450° C.; and recovering $N(CHRCHR)_3N$ from the effluent from the catalyst path.

3. The method of manufacturing triethylenediamine which includes the steps of: distributing kaolin cracking catalyst in a plurality of independent adiabatic beds; providing heat transfer means just prior to the entry of each catalyst bed; directing a reactant stream having as the organic component the vapors of a normally liquid mixture consisting of polymers of ethylene imine through the alternate heat transfer means and catalyst beds so that the temperature at the inlet to the first bed is at least 260° C. and so that the temperature increases at a decreasing rate so that the terminal temperature is at least 350° C. but not more than 450° C., the liquid hourly space velocity of the polymers of ethylene imine being within the range from 0.06 to 0.6; and recovering triethylenediamine from the effluent from the catalyst path.

References Cited in the file of this patent

UNITED STATES PATENTS

| 2,303,075 | Frey | Nov. 24, 1942 |
| 2,977,363 | Farkas et al. | Mar. 28, 1961 |
| 2,977,364 | Mascioli | Mar. 28, 1961 |
| 2,985,658 | Krause | May 23, 1961 |